(12) United States Patent
Taniguchi et al.

(10) Patent No.: US 7,254,780 B2
(45) Date of Patent: Aug. 7, 2007

(54) SYSTEM, DEVICE AND METHOD FOR CONTROLLING DISPLAY PRESENTATION ORDER

(75) Inventors: Shinya Taniguchi, Suwa (JP); Yoshiki Fukui, Suwa (JP); Naruhide Kitada, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 759 days.

(21) Appl. No.: 10/245,515

(22) Filed: Sep. 18, 2002

(65) Prior Publication Data

US 2004/0051703 A1    Mar. 18, 2004

(51) Int. Cl.
*G06F 3/00* (2006.01)
*G06F 9/00* (2006.01)
*G06F 17/00* (2006.01)

(52) U.S. Cl. ............ 715/751; 715/732; 715/753; 715/804; 345/1.1; 345/1.2

(58) Field of Classification Search ........... 715/732, 715/751, 753; 345/1.1, 204
See application file for complete search history.

(56) References Cited

U.S. PATENT DOCUMENTS

| | | | | |
|---|---|---|---|---|
| 5,481,274 A | * | 1/1996 | Aratani et al. | 345/98 |
| 5,828,384 A | * | 10/1998 | Iwasaki et al. | 345/539 |
| 5,881,266 A | * | 3/1999 | Matsumoto | 711/134 |
| 6,047,288 A | * | 4/2000 | Kurosawa et al. | 707/9 |
| 6,128,629 A | * | 10/2000 | Bretschneider et al. | 707/203 |
| 6,473,088 B1 | * | 10/2002 | Matsumoto et al. | 345/530 |
| 6,839,061 B1 | * | 1/2005 | Kamakura et al. | 345/520 |
| 7,006,055 B2 | * | 2/2006 | Sukthankar et al. | 345/1.2 |
| 2003/0085922 A1 | * | 5/2003 | Wei | 345/751 |
| 2004/0083236 A1 | * | 4/2004 | Rust | 707/104.1 |

FOREIGN PATENT DOCUMENTS

| | | |
|---|---|---|
| JP | A-3-235117 | 10/1991 |
| JP | A 7-21000 | 1/1995 |
| JP | A 8-29871 | 2/1996 |
| JP | A-10-232658 | 9/1998 |
| JP | A-10-279207 | 10/1998 |
| JP | A-11-282441 | 10/1999 |
| JP | A-2000-99526 | 4/2000 |
| JP | A-2002-278531 | 9/2002 |

* cited by examiner

*Primary Examiner*—Raymond J. Bayerl
*Assistant Examiner*—Anita Datta Chaudhuri
(74) *Attorney, Agent, or Firm*—Oliff & Berridge, PLC

(57) ABSTRACT

The invention provides a display control system in which the troublesomeness and time required for the presentation and the number of misses upon presentation can be reduced, and a presenter can flexibly respond to the status change of the scheduling of display order. A presenter registers projector display data to a projector via an Internet in a user terminal. In the projector, prior to projection, the projector display data is rearranged in the stack area in accordance with the priority allocated to the projector display data. Upon the projection, a projecting device projects the projection contents based on the projector display data read from the stack area in reading order according to a stack storing system.

14 Claims, 3 Drawing Sheets

[FIG. 1]
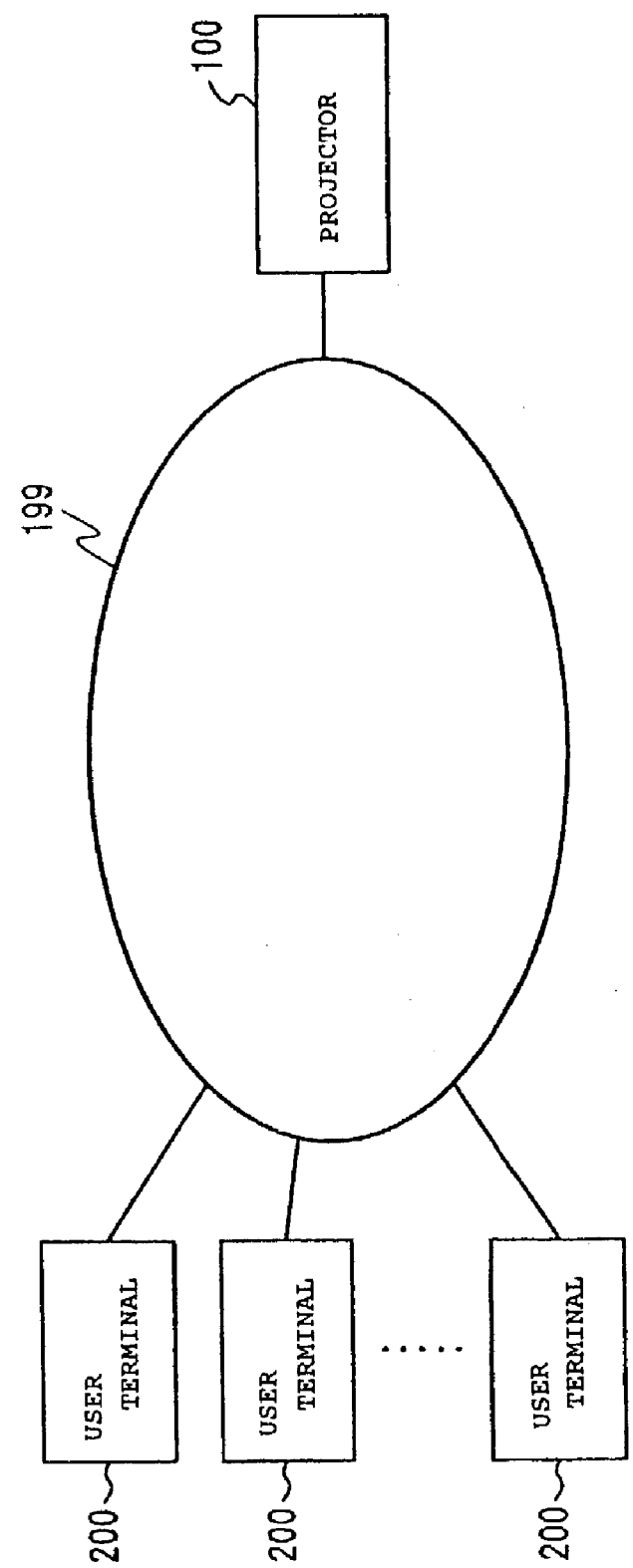

[FIG. 2]
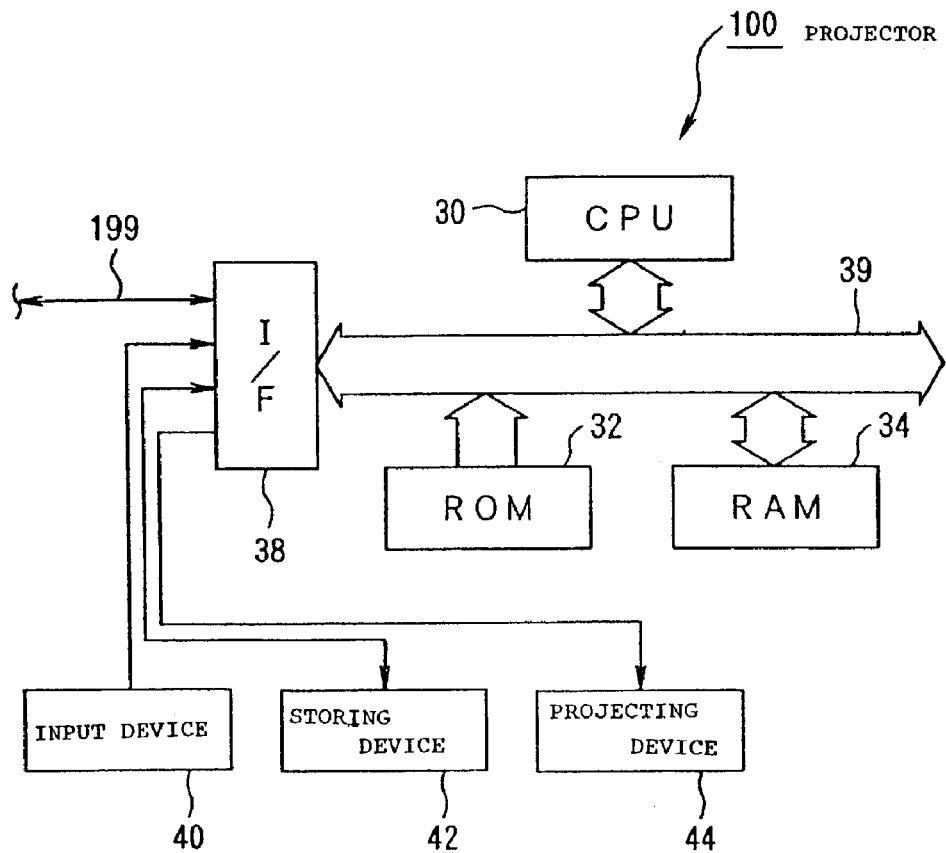
[FIG. 3]
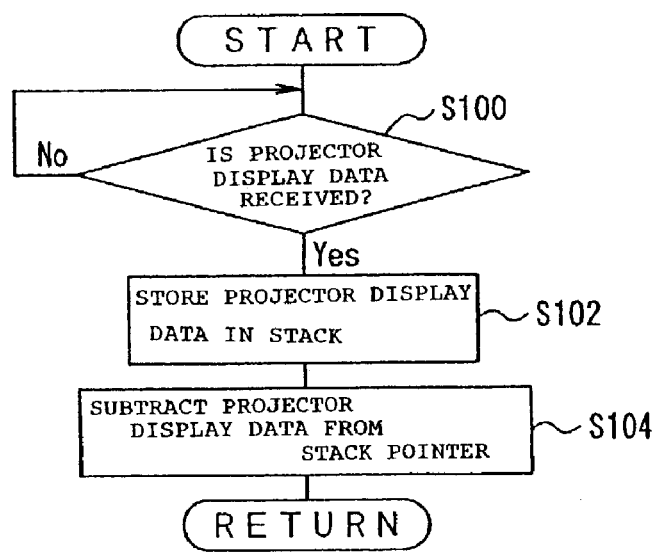

[FIG. 4]
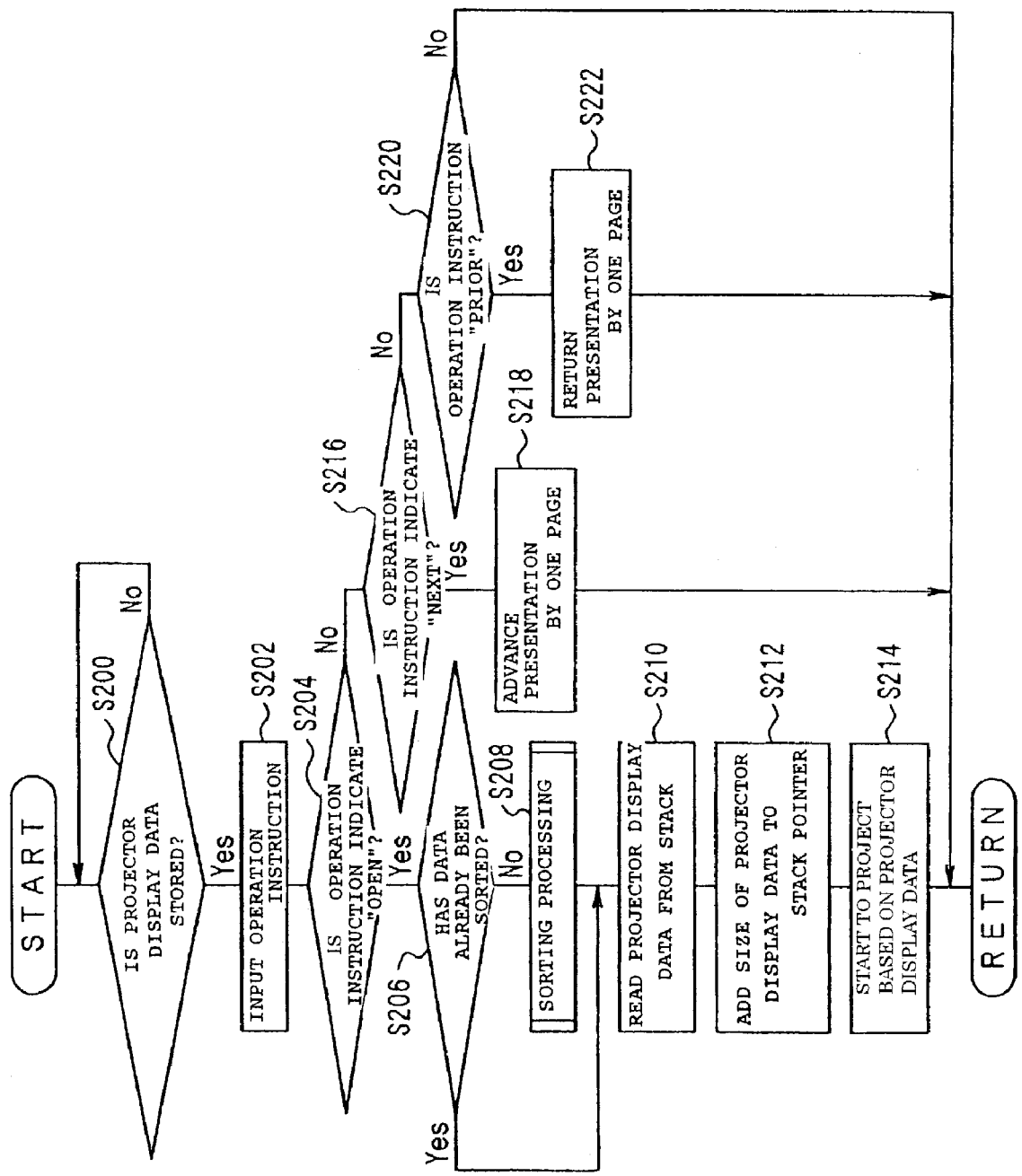

SYSTEM, DEVICE AND METHOD FOR CONTROLLING DISPLAY PRESENTATION ORDER

BACKGROUND OF THE INVENTION

1. Field of Invention

The present invention relates to a system, a device, a program, and a method for displaying data based on received display data. More particularly, the present invention relates to a display control system, a display device, a display control program, and a display control method in which the number of misses upon presentation, and troublesomeness and time required for the presentation, are reduced, and a presenter flexibly performs the status change of the scheduling of the display order.

2. Description of Related Art

Related art projectors to project an image on a screen include a connecting terminal to connect a computer and the like, and a projecting device to project the image on the screen based on an image signal inputted via the connecting terminal. In the case of the presentation using the projector, each presenter connects to the projector, a notebook-type computer or the like to store projector display data as a presentation material by the projector, and performs the presentation while projecting the presentation material by operating the notebook-type computer or the like.

Since the presentation material is stored in the notebook-type computers, etc. of the presenters in many cases, the notebook-type computers, etc. must be connected to the projector every presentation, unless collecting the materials for the presentation of the presenters in the single notebook-type computer in the related-art projector. Thus, the connecting operation is troublesome and complicated, and the operation to carry the notebook-type computer, etc. to a meeting place for the presentation requires labor.

It is typically expected, in the system construction in which the material for the presentation individually formed by the presenters is easily presented, that the presenter not carry the notebook-type computers. For example, according to one method, the presenter stores the material for the presentation in a file server (or, e.g. a storing device in the projector) in advance, and the material for the presentation is automatically read and displayed from the predetermined server upon presentation. In this case, the material for the presentation of the presenter can be read upon presentation. That is, importantly, the material for the presentation can be read corresponding to the presenter.

SUMMARY OF THE INVENTION

According to one method of reading the presentation material corresponding to the presenter, the presenter selects and reads the projector display data from the file server by operation of the projector or the like. Alternatively, according to another method, the presenter schedules the order of reads the projector display data from the file server in advance and reads the projector display data in accordance with the schedule.

However, according to the former method, since the presenter must select and read the projector display data by operating the projector, is subjected to a troublesome and time consuming operation, and further the projector display data of another presenter can be erroneously selected, thereby causing "misses".

On the other hand, according to the latter method, for example, a simple schedule is planned to display the projector display data in the order of storing the projector display data in the file server. However, in this case, when the order of storing the data in the file server does not completely match the presentation order, disadvantageously, the projector display data of the other presenter can be read upon the presentation. Even if the projector display data is stored in the presentation order correctly, the increase in presenters after storage needs to restore the projector display data, thus disabling the flexible response to the status change.

The present invention addresses the above and/or other problems of the related art. The present invention provides a display control system, a display device, a display control program, and a display control method in which the number of misses upon presentation, and troublesomeness and time required for the presentation, are reduced, and a presenter flexibly responds to the status change of the scheduling of the display order.

To address or solve the above, according to a first aspect of the present invention, a display control system to receive a plurality of pieces of display data and display data based on the received display data, includes: a display device; and a display control device to display the display contents on the display means based on the display data. Prior to the display operation, the display control device rearranges the display data in accordance with the priority allocated to the display data in a display data storing device to store the display data and the allocated priority, and displays the display contents on the display device based on the display data read in a predetermined order from the display data storing device upon the display operation.

With above-mentioned structure, the plurality of display data and the allocated priorities are stored in the display data storing device. Then, prior to the display operation, the display control device rearranges the display data in accordance with the priority allocated to the display data in the display data storing device. Upon the display operation, the display control device displays the display contents on the display device based on the display data read in a predetermined order from the display data storing device.

Therefore, in the case of applying the present system to the presentation, each presenter displays the data in the presentation order by allocating the priority corresponding to the presentation order to its display data. The number of presenters may further be added by allocating the priority corresponding to the order. When priorities "10", "20", and "30" are allocated to three pieces of the display data and the display data of another presenter is to be inserted between the display data of the priority "10" and the display data of the priority "20", a priority more than "10" and less than 20 may be allocated to the display data. Thus, it is possible to relatively flexibly respond to the status change without considering the storing order to the display data storing device.

The present system may be realized as a single device or as a network system communicably connected to a plurality of terminals. In the latter case, the components may belong to any of the plurality of terminals if they are connected communicably. The above operation is the same as that of the display control system according to a second aspect.

The priority can statically or dynamically be allocated. In the case of the static allocation of the priority, for example, information indicating the priority is included in the display data in advance. In the case of the dynamic allocation of the priority, for example, the priority is externally inputted before rearrangement upon storing the display data or the like. The above operation is the same as that of the display device according to a third aspect.

The display data storing device may be included in the present system or externally be provided. The above operation is the same as that according to the second aspect.

Further, according to the second aspect of the present invention, a display control system to receive a plurality of pieces of display data and display data based on the received display data, includes: a display device; and a display control device to display the display contents on the display device based on the display data. The display control device selects the display data in accordance with the priority allocated to the display data in a display data storing device to store the display data and the allocated priority, and displays the display contents on the display device based on the selected display data.

With the above-mentioned structure, a plurality of pieces of display data and the allocated priorities are stored in the display data storing device. Then, upon the display operation, the display control device selects the display data from the display data storing device in accordance with the priority allocated to the display data and the display contents are displayed on the display means based on the selected display data.

Therefore, in the case of applying the present system to the presentation, each presenter can display the display data in the presentation order by allocating the priority corresponding to the presentation order to its display data. When priorities "10", "20", and "30" are allocated to three pieces of the display data and the display data of another presenter is to be inserted between the display data of the priority "10" and the display data of the priority "20", for example, a priority larger than "10" and less than 20 may be allocated to the display data. Thus, it is possible to relatively flexibly respond to the status change without considering the storing order to the display data storing device.

The priority can statically or dynamically be allocated. In the case of the static allocation of the priority, information indicating the priority is included in the display data in advance, for example. In the case of the dynamic allocation of the priority, the priority is externally inputted before rearrangement upon storing the display data, for example. The above operation is the same as that of the display device according to a sixth aspect.

To address or solve the above, according to the third aspect of the present invention, a display device to receive a plurality of pieces of display data and display data based on the received display data, includes: a display device; a display storing device to store the display data and the allocated priority; and a display control device to display the display contents on the display device based on the display data stored in the display data storing device. Prior to the display operation, the display control device rearranges the display data in accordance with the priority allocated to the display data in the display data storing device, and displays the display contents on the display device based on the display data read in a predetermined order from the display data storing device upon the display operation.

With the above-described structure, the plurality of pieces of display data and the allocated priorities are stored in the display data storing device. Then, prior to the presentation, the display control device rearranges the display data in accordance with the priority allocated to the display data in the display data storing device, and displays the display contents on the display device based on the display data read in a predetermined order from the display data storing device upon the display operation.

Therefore, in the case of applying the present system to the presentation, each presenter displays the data in the presentation order by allocating the priority corresponding to the presentation order to its display data. The number of presenters may further be added by allocating the priority corresponding to the order. When priorities "10", "20", and "30" are allocated to three pieces of the display data and the display data of another presenter is to be inserted between the display data of the priority "10" and the display data of the priority "20", for example, a priority more than "10" and less than 20 may be allocated to the display data. Thus, it is possible to relatively flexibly respond to the status change without considering the storing order to the display data storing device.

The display data storing device stores the display data by any device at any timing. It may store the display data in advance or may store the display data by external input upon operating the present system without storing the display data in advance. The above operation is the same as that of the display device according to the sixth aspect.

Further, according to a fourth aspect of the present invention, in the display device according to the third aspect, the display data includes priority information indicating the priority, and prior to the display operation, the display control device rearranges the display data in accordance with the priority specified by the priority information included in the display data in the display data storing device.

With the above-mentioned structure, prior to the display operation, the display control device rearranges the display data in accordance with the priority specified by the priority information included in the display data in the display data storing device.

Further, according to a fifth aspect of the present invention, in the display device according to the third or fourth aspects, the predetermined order is a reading order in accordance with a stack storing system, and prior to the display operation, the display control device rearranges the display data so that the display data with the allocated higher priority is ahead in the display data storing device.

With the above-mentioned structure, prior to the display operation, the display control device rearranges the display data so that the display data with the allocated higher priority is ahead in the display data storing device.

Further, according to the sixth aspect of the present invention, a display device to receive a plurality of pieces of display data and display data based on the received display data, includes: a display device; a display data storing device to store the display data and the allocated priority; and a display control device to display the display contents on the display device based on the display data stored in the display data storing device. The display control device selects the display data in accordance with the priority allocated to the display data in display data storing device, and displays the display contents on the display device based on the selected display data read in a predetermined order from the display data storing device upon the display operation.

With the above-mentioned structure, the plurality of pieces of display data and the allocated priorities are stored in the display data storing device. Then, upon the display operation, the display control device selects the display data in accordance with the priority allocated to the display data in display data storing device, and displays the display contents on the display device based on the selected display data read in a predetermined order from the display data storing device upon the display operation.

Therefore, in the case of applying the present system to the presentation, each presenter displays the data in the presentation order by allocating the priority corresponding to the presentation order to its display data. The number of presenters may further be added by allocating the priority corresponding to the order. When priorities "10", "20", and "30" are allocated to three pieces of the display data and the display data of another presenter is to be inserted between the display data of the priority "10" and the display data of the priority "20", a priority larger than "10" and less than 20 may be allocated to the display data, for example. Thus, it is possible to relatively flexibly respond to the status change without considering the storing order to the display data storing device.

Furthermore, according to a seventh aspect of the present invention, in the display device according to the sixth aspect, the display data includes priority information indicating the priority, and the display control device selects the display data in accordance with the priority specified by the priority information included in the display data in the display data storing device.

With the above-mentioned structure, the display control device selects the display data in accordance with the priority specified by the priority information included in the display data in the display data storing device.

Further, according to an eighth aspect of the present invention, the display device according to any one of the third to seventh aspects is a projection-type display device.

With the above-described structure, the projection-type display device projects and displays the data based on the received display data.

In order to address or accomplish the above, according to a ninth aspect of the present invention, a display control program executed by a computer having a display device and a display data storing device to store the display data and allocated priority, includes: a program for displaying the display contents on the display device based on the display data of the display data storing device; and a program for, prior to the display operation, rearranging the display data in accordance with the priority allocated to the display data in the display data storing device, and displaying the display contents on the display device based on the display data read in a predetermined order from the display data storing device upon the display operation.

With the above-mentioned structure, the computer reads the program and executes the processing in accordance with the read program. Accordingly, the same operation as that of the display device according to the third aspect is obtained.

Further, according to a tenth aspect of the present invention, a display control program executed by a computer having display device and display data storing device to store the display data and allocated priority, includes: a program for displaying the display contents on the display device based on the display data of the display data storing device; and a program for selecting the display data in accordance with the priority allocated to the display data in display data storing device to store the display data and the allocated priority, and displaying the display contents on the display device based on the selected display data.

With the above-described structure, the computer reads the program and executes the processing in accordance with the read program. Accordingly, the same operation as that of the display device according to the sixth aspect is obtained.

On the other hand, in order to address or accomplish the above, according to an eleventh aspect of the present invention, a display control method to receive a plurality of pieces of display data and display data based on the received display data, includes: rearranging, prior to the display operation, the display data in accordance with the priority allocated to the display data in a display data storing device to store the display data and the allocated priority; and displaying, upon the display operation, the display contents on a display device based on the display data read in a predetermined order from the display data storing device.

Further, according to a twelfth aspect of the present invention, a display control method in a system to receive a plurality of pieces of display data and display data based on the received display data, includes: selecting the display data in accordance with the priority allocated to the display data in display data storing device to store the display data and allocated priority; and displaying the display contents on the display device based on the display data selected in the selecting step.

BRIEF DESCRIPTION OF THE DRAWINGS

FIG. 1 is a schematic showing the structure of a network system of the present invention;

FIG. 2 is a schematic showing the structure of a projector 100;

FIG. 3 is a flowchart showing the projector display data registering processing;

FIG. 4 is a flowchart showing the projector control processing.

DETAILED DESCRIPTION OF PREFERRED EMBODIMENTS

An exemplary embodiment of the present invention is further illustrated with the drawings. FIGS. 1 to 4 are schematics and flowcharts showing the display control system, the display device and the display control program, and the display control method of the present invention.

According to the exemplary embodiment of the present invention, referring to FIG. 1, in the display control system, the display device and the display control program, and the display control method, each presenter sends projector display data formed by a user terminal 200 to a projector 100, and the projector 100 projects the data based on the received plural projector display data, thus performing the presentation.

First, a description is provided of the structure of a network system of the present invention with reference to FIG. 1. FIG. 1 is a schematic showing the structure of the network system of the present invention.

Referring to FIG. 1, connected to an Internet 199, the projector 100 to project data based on the received projector display data and a plurality of the user terminals 200 used by the presenters.

The user terminal 200 has the same functions as those of a general computer which connects a CPU, a ROM, a RAM, an I/F, and the like by a bus. A storing device of the user terminal 200 stores the projector display data which is to be projected by the projector as a presentation material. The projector display data contains information on priorities information indicating the priority and one or plural page data having the display contents segmented by the page unit. The priority is uniquely set by the presenter. For example, if the presentation order is third, the priority is set as "3".

Next, a detailed description is provided of the structure of the projector 100 with reference to FIG. 2. FIG. 2 is a schematic showing the structure of the projector 100.

Referring to FIG. 2, the projector 100 includes a CPU 30 to control the calculation and the entire system based on a control program, a ROM 32 for previously storing a control program and the like of the CPU 30 at a predetermined area, a RAM 34 to store the calculation result necessary for a calculation step of the CPU 30 and the data read from the ROM 32 or the like, and an I/F 38 to intermediate an input and an output of the data to the external device. The above-mentioned components are connected via a bus 39 as a signal line to transfer the data to receive and transmit the data.

Connected to the I/F 38 are an input device 40 includes a keyboard or a mouse to allow inputting data as a human interface, a storing device 42 to store the data and table as a file, a projecting device 44 to project the screen based on an image signal, and a signal line to connect to the Internet 199, as external devices.

The CPU 30 includes a micro processing unit (MPU) and the like. The CPU 30 starts a predetermined program stored in a predetermined area of the ROM 32, and executes projector display data registering processing and projector control processing shown in the flowcharts in FIGS. 3 and 4 in accordance with the program.

First, the projector display data registering processing is described below in detail with reference to FIG. 3. FIG. 3 is a flowchart showing the projector display data registering processing.

In the projector display data registering processing, the projector display data transmitted from the user terminal 200 is registered in the storing device 42. Referring to FIG. 3, the projector display data registering processing is executed by the CPU 30 and then the processing routine advances to step S100.

In step S100, it is determined whether or not the projector display data is received. If it is determined that the projector display data is received (Yes), the processing routine advances to step S102. However, if not so (No), the CPU 30 waits in step S100 until the projector display data is received.

In step S102, the received projector display data is stored in a stack area of the storing device 42. The stack area is a part of a storing area of the storing device 42 and the head address is indicated by a pointer called a stack pointer.

Next, in step S104, the size of the received projector display data is subtracted from the stack pointer, a series of processing ends, and the processing routine returns to the original processing.

Next, a detailed description is provided of the projector control processing with reference to FIG. 4. FIG. 4 is a flowchart showing the projector control processing.

In the projector control processing, the projector 100 is controlled in response to the received operation instruction. Referring to FIG. 4, the projector control processing is executed by the CPU 30 and first the processing routine advances to step S200.

In step S200, it is determined whether or not the projector display data is stored in the stack area. If it is determined that the projector display data is stored in the stack area (Yes), the processing routine advances to step S202. However, if not so (No), the CPU 30 waits in step S200.

In step S202, the operation instruction is inputted from the input device 40. In step S204, it is determined whether or not the input operation instruction indicates an instruction "OPEN" to start the projection by the projector 100. If it is determined that the input operation instruction indicates "OPEN" (Yes), the processing routine advances to step S206.

In step S206, it is determined whether or not the projector display data in the stack area is sorted. If it is determined that the projector display data in the stack area is not sorted (No), the processing routine advances to step S208 whereupon processing to sort the projector display data in the stack area is executed. Specifically, in step S208, the projector display data is rearranged in the stack area in accordance with the priority specified by the priority information included in the projector display data. In this case, as higher the priority specified by the priority information included in the projector display data is, the projector display data is rearranged so that the data is positioned in the head direction of the stack area.

Next, in step S210, the projector display data is read from the head of the stack area. In step S212, the size of the read projector display data is added to the stack pointer. In step S214, the projecting device 44 starts the projection based on the read projector display data, a series of processing ends, and the processing routine returns to the original processing.

If it is determined in step S206 that the projector display data in the stack area is sorted (Yes), the processing routine advances toe step S210.

If it is determined in step S204 that the input operation instruction does not indicate "OPEN" (No), the processing routine advances to step S216 whereupon it is determined whether or not the input operation instruction indicates "NEXT" that the presentation during projection advances to one next page. If it is determined that the input operation instruction indicates "NEXT" (Yes), the processing routine advances to step S218 whereupon the presentation during projection advances to one next page. Then, a series of processing ends and the processing routine returns to the original processing.

If it is determined in step S216 that the input operation instruction does not indicate "NEXT" (No), in step S220, it is determined whether or not the input operation instruction indicates an instruction "PRIOR" indicating that the presentation during the projection returns to one prior page. If it is determined that the input operation instruction indicates the instruction "PRIOR" (Yes), in step S220, the presentation during projection returns to one prior page. Then, a series of processing ends and the processing routine returns to the original processing.

On the other hand, it is determined in step S220 that the input operation instruction does not indicate "PRIOR" (No), a series of processing ends and the processing routine returns the original processing.

Next, the operation according to the exemplary embodiment above mentioned is described below.

First, a description is provided of registering the projector display data of the presenter to the projector 100.

In the user terminal 200, the presenter forms the projector display data as the presentation material, sets the priority to the priority information included in the projector display data in accordance with presenter's priority, and transmits the projector display data to the projector 100.

In the projector 100, the projector display data is received and, in steps S102 and S104, the received projector display data is stored in the stack area. The size of the received projector display data is subtracted from the stack pointer. This operation is repeated for all the presenters, thereby storing the projector display data of the presenters in the stack area in the registration order.

Next, a description is provided of the presentation in the projector 100 by the presenter.

As mentioned above, when the projector display data of the presenter is stored in the stack area and the presenter simultaneously performs the presentation, the presenter inputs the operation instruction "OPEN" to the input device 40 in the projector 100.

The operation instruction "OPEN" is inputted, the projector display data in the stack area is not sorted in the projector 100. Then, in steps S206 and S208, the projector display data is rearranged in the stack area in accordance with the priorities specified by the priority information included in the projector display data. In this case, the projector display data is rearranged so that as the priority specified by the priority information included in the projector display data is higher, the projector display data is arranged in the head direction of the stack area. That is, since the priority is set to the priority information in accordance with the presentation order, as the presenter order is ahead, the projector displayed data of the presenter is ahead in the stack area.

In steps S210 to S214, the projector display data is read from the head of the stack area, the size of the read projector display data is added to the stack pointer, and the projecting device 44 starts the projection based on the read projector display data. Since the projector display data is rearranged in the stack area in the presentation order, in this case, the projector starts projection based on the projector display data of the first presenter.

Next, when the second presenter performs the presentation in the presentation order, the presenter also inputs the operation instruction "OPEN" to the input device 40 in the projector 100. The operation instruction is newly inputted, and then the projection starts based on the projector display data of the second presenter in the projector 100. The operation is the same as that of the presenter subsequent to the third one.

The presenter inputs the operation instruction "NEXT" to the input device 40 in the projector 100, thereby advancing the presentation to one next page during the presentation. The operation instruction "NEXT" is inputted, and then in steps S216 and S218, the presentation during the projection advances to one next page in the projector 100.

The presenter inputs the operation instruction "PRIOR" to the input device 40 in the projector 100, thereby returning the presentation to one prior page during the presentation. The operation instruction "PRIOR" is inputted, and then in steps S220 and S222, the presentation during the projection returns to one prior page in the projector 100.

As mentioned above, the presenter allocates the priority to his projector display data in accordance with the presentation order, and can display the page in the presentation order. The priority may be allocated in accordance with the corresponding order, thereby additionally increasing the presentation. Thus, the presenter can respond to the status change relatively flexibly without considering the registration order to the projector 100.

As mentioned above, according to the exemplary embodiment, prior to the projection, the projector 100 rearranges the projector display data in the stack area in accordance with the priority allocated to the projector display data. Upon projection, the projecting device 44 projects the projection contents based on the projector display data read from the stack area in the reading order according to the stack storing system.

Thus, the presenter can project the page in the relatively appropriate order without operation working upon presentation. Therefore, as compared with the related art, the number of misses upon presentation, and troublesomeness and time required for the presentation, are reduced. Further, since the projecting order can be scheduled relatively flexibly as compared with the related arts, the presenter flexibly responds to the status change of the scheduling of the projecting order.

Furthermore, according to the exemplary embodiment, the projector display data includes the priority information indicating the priority. Prior to the projection, the projector 100 rearranges the projector display data in the stack area in accordance with the priority specified by the priority information included in the projector display data.

Thus, since the priority information is previously included in the projector display data, the troublesomeness and the time required for the presentation can be reduced.

According to the exemplary embodiment, the projector display data corresponds to the display data according to the first to seventh or ninth to twelfth aspects. The CPU 30 corresponds to the display control device according to the first to seventh, or ninth or tenth aspects. The storing device 42 corresponds to the display data storing device according to the first to seventh or ninth to twelfth aspects. The projecting device 44 corresponds to the display device according to the first to third, sixth or ninth to twelfth aspects. The projector 100 corresponds to the display device according to the third to eighth aspects, or the projection-type display device according to the eighth aspect. Step S208 corresponds to the rearranging step according to the eleventh aspect, or the selecting step according to the twelfth aspect.

According to the exemplary embodiment above mentioned, step S214 corresponds to the display step according to the eleventh or twelfth aspects.

According to the exemplary embodiment above mentioned, the projector display data is registered in the storing device 42 of the projector 100. However, the present invention is not limited to this and a file server may be provided on the Internet 199 and the projector display data may be registered in the file server. In this case, the projector 100 obtains the projector display data necessary for the start of the projection from the file server.

Further, according to the exemplary embodiment above mentioned, the storing device 42 is provided for the projector 100. However, the present invention is not limited to this, a reading device to read a storage medium may be provided for the projector 100, the storage medium to register the plural projector display data may be provided for the projector 100, and the projector display data may be obtained from the provided storage medium.

According to the exemplary embodiment above mentioned, the projector display data registering processing and the projector control processing shown in the flowcharts in FIGS. 3 and 4 are executed by executing the control program which is previously stored in the ROM 32. However, the present invention is not limited to this and the program may be read to the RAM 34 from a storage medium to store a program indicating the processing routines and then may be executed.

The storage medium includes a semiconductor storage medium, such as a RAM and a ROM, a magnetic storage type storage medium, such as an FD and an HD, an optical reading type storage medium, such as a CD, a CDV, an LD, and a DVD, and a magnetic storage type/optical reading type storage medium, such as an MO. The storage medium includes any of computer-readable storage mediums, irrespective of digital, magnetic, and optical reading methods.

According to the exemplary embodiment above mentioned, the display control system, the display device and display control system, and the display control method of the present invention are applied to the network system including the Internet 199. However, the present invention is not limited to this and may be applied to the Intranet for communication by the same system as that of the Internet 199. Of course, the present invention is not limited to the network for communication by the same system as that of the Internet 199 and can be applied to general networks.

According to the above exemplary embodiment, the display control system, the display device and display control system, and the display control method of the present invention are applied to the case in which, as shown in FIG. 1, the projector display data formed by the user terminal 200 by the presenter is transmitted to the projector 100, the projector 100 projects the page based on the received plural projector display data in the predetermined order, and thus the presentation is performed. However, the present invention is not limited to this and may be applied to other cases without departing the essentials of the present invention.

ADVANTAGES

As described above, in the display control system according to the first or second aspects of the present invention, since the data can be displayed in the relatively appropriate order without operation working upon presentation, as compared with the related art, advantageously, the number of misses upon presentation, and troublesomeness and time required for the presentation are reduced. Further, since the presenter can schedule the display order relatively flexibly, as compared with the related art, advantageously, the presenter flexibly responds to the status change of the scheduling of the display order.

In the display device according to the third to sixth aspects of the present invention, since the data can be displayed in the relatively appropriate order without operation working upon presentation, as compared with the related art, advantageously, the number of misses upon presentation, and troublesomeness and time required for the presentation are reduced. Further, since the presenter can schedule the display order relatively flexibly, as compared with the related art, advantageously, the presenter flexibly responds to the status change of the scheduling of the display order.

Further, in the display device according to the fourth aspect of the present invention, since the priority information may previously be stored in the display data, advantageously, the troublesomeness and the time required for the presentation can further be reduced.

Furthermore, in the display device according to the seventh aspect of the present invention, since the priority information may previously be stored in the display data, advantageously, the troublesomeness and the time required for the presentation can further be reduced.

In the display control program according to the ninth aspect of the present invention, the same advantages as those of the display device according to third aspect are obtained.

Further, in the display control program according to the tenth aspect of the present invention, the same advantages as those of the display device according to the sixth aspect are obtained.

In the display control method according to the eleventh aspect of the present invention, advantageously, the same advantages as those of the display control system according to the first aspect are obtained.

Further, in the display control method according to the twelfth aspect of the present invention, the same advantages as those of the display control system according to the second aspect are obtained.

The invention claimed is:

1. A display control system to receive a plurality of display data and to display a display content based on the received plurality of display data, the display control system comprising:

a display device;

a display data storing device that stores the plurality of display data; and a display control device to display the display content on the display device based on the plurality of display data, wherein the display control device rearranges the plurality of display data stored in the display data storing device in a predetermined order in accordance with a priority embedded on each display data indicative of its relative display order with respect to the other display data, wherein the display control device displays the display content on the display device based on the predetermined order, and wherein the priority is based upon an order of presenters.

2. A display control system to receive a plurality of display data and to display a display content based on the received plurality of display data, the display control system comprising:

a display device;

a display data storing device that stores a plurality of display data; and a display control device that displays the display content on the display device based on the plurality of display data, wherein the display control device selects the display data in accordance with a priority embedded on each display data indicative of its relative display order with respect to the other display data, wherein the display control device rearranges the plurality of display data stored in the display data storing device in a predetermined order in accordance with the priority, wherein the display control device displays the display content on the display device based on the selected display data, and wherein the priority is based upon an order of presenters.

3. A display device to receive a plurality of display data and to display a display content based on the received plurality of display data, the display device comprising:

a display device;

a display data storing device that stores the plurality of display data; and a display control device that displays the display content on the display device, wherein the display control device rearranges the plurality of display data stored in the display data storing device in a predetermined order in accordance with a priority embedded on each display data indicative of its relative display order with respect to the other display data, wherein the display control device displays the display content on the display device based on the predetermined order, and wherein the predetermined order is based upon an order of presenters.

4. The display device according to claim 3, wherein the display data includes priority information indicating a priority embedded on each display data indicative of its relative display order with respect to the other display data, and wherein the display control device rearranges the plurality of display data in accordance with the priority prior to displaying the display data upon the display device.

5. The display device according to claim 3,
wherein the predetermined order is a reading order in accordance with a stack storing system, and
wherein said display control device rearranges the display data so that the display data with an allocated higher priority is ahead of display data with an allocated lower priority in the display data storing device.

6. A display device to receive a plurality of display data and to display a display content based on the received plurality of display data, the display device comprising:
   a display device;
   a display data storing device that stores the plurality of display data and a priority embedded on each display data indicative of its relative display order with respect to the other display data; and
   a display control device that displays the display content on the display device based on the plurality of display data stored in said display data storing device,
   wherein the display control device rearranges the plurality of display data stored in the display data storing device in a predetermined order in accordance with the priority,
   wherein the display control device selects the display data in accordance with the priority,
   wherein the display control device displays the display content on the display device based on the selected display data, and
   wherein the priority is based upon an order of presenters.

7. The display device according to claim 6, said display data including priority information indicating the priority, and
   said display control device selecting the display data in accordance with the priority specified by the priority information included in the display data in said display data storing device.

8. The display device according to claim 3, said display device being a projection-type display device.

9. A display control program executed by a computer having a display device and a display data storing device that stores a plurality of display data and a priority allocated to each of the plurality of display data, the display control program comprising:
   a program for displaying a display content on the display device based on the plurality of display data stored within the display data storing device; and
   a program for rearranging the plurality of display data stored in the display data storing device in a predetermined order in accordance with a priority embedded on each display data indicative of its relative display order with respect to the other display data, and displaying the display content on the display device based on the predetermined order, and
   wherein the priority is based upon an order of presenters.

10. A display control program executed by a computer having a display device and a display data storing device that stores a plurality of display data and a priority allocated to each of the plurality of display data, the display control program comprising:
    a program for displaying a display content on the display device based on the plurality of display data stored within the display data storing device; and
    a program for selecting the plurality of display data in accordance with the priority embedded on each display data indicative of its relative display order with respect to the other display data and displaying the display content on the display device based on the selected display data,
    wherein the display control device rearranges the plurality of display data stored in the display data storing device in a predetermined order in accordance with the priority, and
    wherein the priority allocated to each of the plurality of display data is based upon an order of presenters.

11. A display control method to receive a plurality of display data and to display a display content based on the received plurality of display data, the method comprising:
    rearranging the plurality of display data in a predetermined order in accordance with a priority embedded on each display data indicative of its relative display order with respect to the other display data; and
    displaying a display content on the display device based on the plurality of display data read in the predetermined order from the display data storing device, and
    wherein the priority is based upon an order of presenters.

12. A display control method in a system that receives a plurality of display data and displays a display content based on the received plurality of display data, the method comprising:
    selecting the display data in accordance with a priority embedded on each display data indicative of its relative display order with respect to the other display data; and
    displaying the display content on the display device based on the display data selected,
    wherein the display control device rearranges the plurality of display data stored in the display data storing device in a predetermined order in accordance with the priority, and
    wherein the priority allocated to each of the plurality of display data is based upon an order of presenters.

13. The display control system according to claim 1 wherein the priority is allocated to the plurality of display data statically.

14. The display control system according to claim 1 wherein the priority is allocated to the plurality of display data dynamically.

* * * * *